Dec. 20, 1927.

C. C. BENNETT 1,653,249

AXLE ALIGNING GAUGE

Filed May 2, 1927

INVENTOR
Claude C. Bennett
BY
Frank Warren
ATTORNEY

Patented Dec. 20, 1927.

1,653,249

UNITED STATES PATENT OFFICE.

CLAUDE C. BENNETT, OF SEATTLE, WASHINGTON.

AXLE-ALIGNING GAUGE.

Application filed May 2, 1927. Serial No. 188,079.

My invention relates to improvements in wheel and axle aligning gauges for use in connection with motor vehicles and the object of my invention is to provide a gauge that may be applied to the front wheel of a motor vehicle to determine the camber of said front wheel; or that may be applied to a front bearing spindle from which the wheel is removed to determine the camber that a wheel would have when placed on said spindle; or that may be applied to the upright spindle pin holes of the front axle of a motor vehicle to gauge the angle of the upright spindle pin or to gauge the forward or rearward tilt or caster of the front axle of the vehicle.

Another object is to provide a wheel aligning gauge of this nature in which the angles are read directly off of the gauge thus tending to eliminate errors, saving time and rendering the device simple and easy to use.

Further objects are to provide a wheel aligning gauge that is simple in construction, not expensive to manufacture, reliable in operation and readily adaptable to vehicles of various different types.

Other and more specified objects will be apparent from the following description taken in connection with the accompanying drawings.

In the drawings Figure 1 is a view in elevation of a wheel and axle aligning gauge constructed in accordance with my invention as it may appear when applied to the front wheel of a motor vehicle, the vehicle wheel together with parts of the hub and spindle being shown in section, said Fig. 1 illustrating the gauge as applied directly to the wheel to determine the camber of said wheel.

Figure 1:
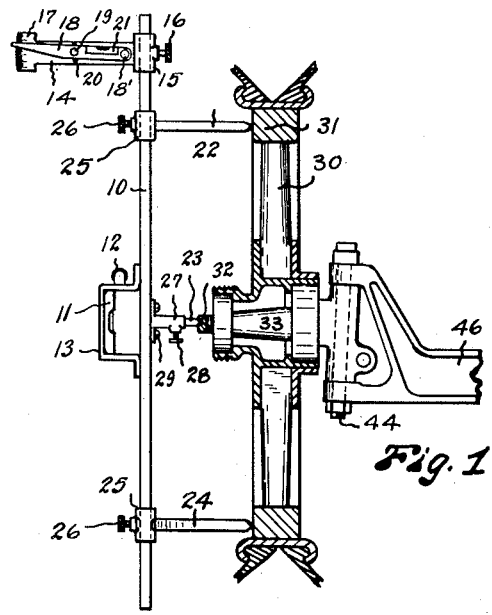

The front wheels of motor vehicles are ordinarily inclined or adjusted so that said front wheels are closer together at the bottom than at the top. This incline of the wheels is ordinarily called the camber. The front wheels of motor vehicles are ordinarily adjusted at the factory so that they have the correct camber but this adjustment may be disturbed, by wear, and by shocks and collisions, to such an extent that the vehicle may steer hard or the front tires may wear too rapidly in which case it may be necessary to readjust the camber of the wheels. It also sometimes happens that the front axle will become tilted or twisted out of the correct position, the top of the axle becoming tilted too far forward or too far rearward relative to the bottom thus making the vehicle difficult to steer. My gauge makes it possible to detect errors in the camber of the front wheels and in the inclination, commonly called the caster, of the front axle and to determine the location of the part in which the wear or deflection that produces the error resides. This gauge employs several different parts and attachments all of which are used in making some of the required tests.

Referring to the drawings, throughout which like reference numerals designate like parts, 10 designates a straight metal bar, preferably square in cross section, and provided substantially midway between its two ends with a bubble tube 11, arranged parallel to use the bar 10 as a level. Another bubble tube 12 perpendicular to the bar 10 is provided adjacent the tube 11 for plumbing the bar in one direction as hereinafter described. The bubble tubes 11 and 12 may be supported by a bracket 13.

All parts of the gauge except the bubble tubes 11 and 12 are preferably adjustable relative to the bar 10 and entirely removable from said bar, said parts being adapted to cooperate, as hereinafter described, in making the measurements that are required for properly adjusting the wheel and axle. These several parts are hereinafter described in detail.

As a means for determining or reading directly the various angles that are to be measured I provide an angle gauge comprising a flat plate 14 having a socket 15 on one end adapted to fit slidably on the bar 10 and tube secured thereto by a thumb screw 16, the socket 15 being accurately machined so as to fit the bar closely and hold the plate 14 always at right angles to the bar 10. The outer end of the plate 14 is widened as at 17 to afford room for marking graduations thereon, said graduations preferably being spaced so as to indicate the camber of a wheel in inches. A level arm 18 is connected by a pivot 18' with the plate 14 near the socket 15. A thumb screw 19 passes through a slot 20 in the plate 14 and is threaded into the arm 18 so as to hold said level arm 18 immovable in any position into which it may be adjusted. A normally horizontal bubble tube 21 is secured to the level arm 18, preferably parallel with the top edge thereof, said top edge being the edge from which the graduations on the dial portion 17 are read. To determine the inclination of the bar 10, relative to the true vertical, in a plane common to the bar 10 and guage plate 14, the level arm 18 is adjusted into a horizontal position as indicated by the bubble 21 and the inclination of the bar, is read directly from the scale on the dial portion 17, it being assumed that the bar 10 is held in a fixed position while the measurement is being made. This reading gives the camber of the wheel in inches. The above described device for reading the various angles is used in making all of the measurements hereinafter described.

For measuring the camber of a wheel by applying the gauge directly to the wheel, I provide, on the bar 10, an upper gauge arm 22, a hub centering pin 23 and a lower gauge fork 24. The gauge pin 22 and gauge fork 24 each have rigidly mounted sockets 25 on one end that are slidable on the bar 10 and arranged to be held in adjusted positions on said bar by thumb screws 26. The hub centering pin 23 is adjustably held within a socket 27 by a thumb screw 28. The socket 27 is removably secured, as by screws 29, to the bar 10 preferably directly opposite to the level tubes 11 and 12.

In the use of this gauge for determining the camber of a wheel 30 of a motor vehicle Fig. 1, the front axle of said motor vehicle is first made level, using the rod 10 as a leveling means if desired. The gauge pin 22 and gauge fork 24 are then adjusted to the diameter of the rim 31 and are placed against the side of said rim 31 at the top and bottom of the wheel respectively. The hub centering pin 23 is adjusted lengthwise in the socket 27 until it fits within the centering hole 32 in the end of the bearing spindle 33 on which the wheel is mounted, the hub cap having been previously removed. With the hub centering pin 23 serving as a pivot the gauge bar 10 is adjusted until the level tube 12 indicates that said bar is exactly plumb relative to a plane perpendicular to the plane of the wheel. The gauge pin 22 and gauge fork 24 are of exactly the same length and are held firmly against the wheel so that the inclination of the bar 10 in a plane parallel to the plane of the wheel is exactly the same as the inclination of the wheel. The centering pin 10 does not bear against the spindle 33 but merely serves as a centering device to insure that the bar 10 will be held exactly diametrical relative to the wheel when the measurement is taken. The gauge fork 24 prevents the bar from being tilted sidewise. With the gauge bar held firmly in the position just described and shown in Fig. 1, the level arm 17 is adjusted so that the bubble tube 21 is exactly level whereupon the inclination or camber of the wheel 30, preferably in inches, may be read directly from the dial 17. The proper inclination or camber for the wheel, being known, may be compared with the reading thus taken to determine the amount of adjustment, if any, that is needed.

Figure 2:
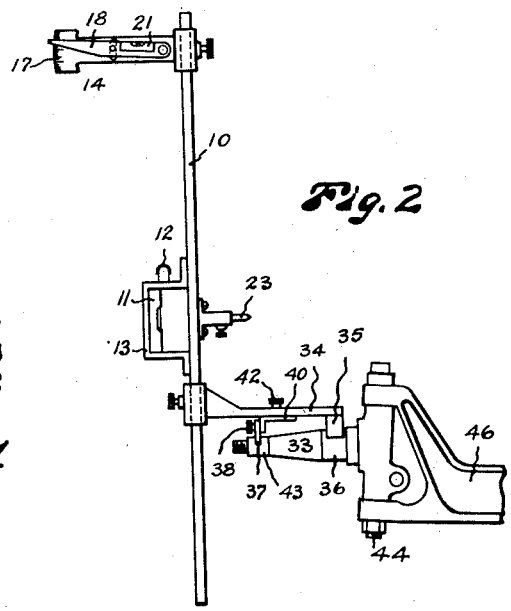
Fig. 2 is a similar view with the wheel removed, showing the gauge applied directly to the bearing spindle of the front axle of a motor vehicle to determine the angle of said bearing spindle thereby affording the information necessary in determining the camber that a wheel would have when placed on said axle.

If the wheel itself is broken or is warped or sprung out of shape it may be desired to apply the gauge directly to the bearing spindle 33 to determine whether said spindle is also out of line. This may be done by removing the vehicle wheel, as shown in Fig. 2, and placing on the bar 10, a gauge arm 34 having, at its end remote from the bar 10, a V-shaped block 35 arranged to rest on the cylindrical portion 36 of the spindle 33 on which the inner roller bearing is ordinarily placed. Another V-shaped member 37 is adjustably secured by a thumb screw 38 to an angle plate 40 that is adjustable longitudinally of the arm 34 by means of a slot 41 and thumb screw 42, said last named V-shaped member 37 being arranged to rest on the outer cylindrical bearing receiving portion 43 of the spindle 33. The last named V-shaped member is adjusted so that the gauge arm 34 is exactly parallel to the axis of the bearing spindle 33 when placed as shown in Fig. 2. This gives to the bar 10, when plumb in one plane, as indicated by the bubble tube 12, the same inclination in a plane at right angles to the bearing spindle 33 as a wheel would have if placed on said bearing spindle thus giving the camber of the wheel. This camber may be read directly from the dial 17 by adjusting the level arm 18 into exactly a horizontal position and reading the amount indicated by said level arm on the dial.

If the bearing spindle 33 is not in correct alignment the error may be due to the fact that the vertical spindle pin 44 that passes through the holes 45 in the front axle 46 and connects the bearing spindle 33 to said axle is out of alignment. The alignment of these holes may be checked by removing the spindle pin 44, inserting a bar 47 through these holes, accurately aligning the bar axially of the holes 45 by means of cones 48 which are slidable on the bar and adapted to be forced into the holes and using the gauge to determine the angle of inclination of the holes in the manner shown in Fig. 3. When the gauge is thus used the gauge fork 24 is replaced by a gauge pin 50 which may be a duplicate of the gauge pin 22. In making this measurement the bar 47 is first correctly positioned, the gauge pins 22 and 50 are then placed against said bar 47, the bar 10 is plumbed as nearly as possible and the level arm 18 is then adjusted to indicate on the dial 17 the inclination of the holes 45. In practice these holes are ordinarily aligned so that their common axial line, produced, would intersect the ground in substantially the medial plane of the adjacent front wheel.

Figure 3:
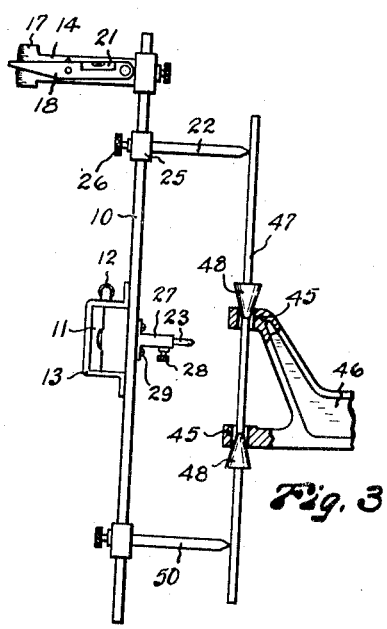
Fig. 3 is a view in elevation illustrating the gauge as applied to the front axle of a motor vehicle and engaging within the spindle pin holes for gauging the angle of the upright spindle pin that connects the bearing spindle with the axle.
Figure 4:
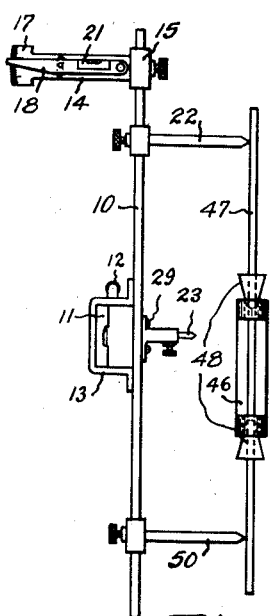
Fig. 4 is a view similar to Fig. 3 showing the gauge used to measure the forward or rearward tilt or caster of a front axle.
Figure 5:
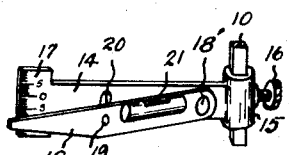
Figs. 5, 6 and 7 are detached views of attachments or parts used in connection with this gauge.
Figure 6:
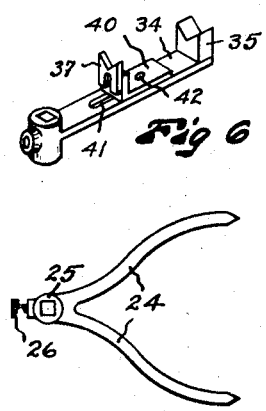
Figure 7:
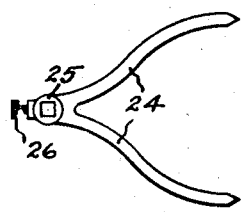

By turning the gauge at right angles to the position shown in Fig. 3, namely into the position shown in Fig. 4, I am able to measure the inclination in a forward and rearward direction of the axis common to said holes thus giving me what is commonly termed the caster of the front axle.

This gauge, when used in the manner hereinbefore described will enable a mechanic to quickly an easily determine the camber of the front wheels and the caster of the front axle and to locate the source of error in case the camber is not correct. The gauge is simple in construction, easy to use and gives the readings directly thus minimizing the possibilities of error.

The foregoing description and accompanying drawings clearly disclose a preferred embodiment of my invention but it will be understood that this disclosure is merely illustrative and that changes in the device may be made within the scope and spirit of the following claims.

What I claim is:—

1. In a wheel gauge, a straight bar, gauge arms disposed on said straight bar for engaging with substantially diametrically opposite points on a wheel rim to support said bar in parallelism with the wheel, centering means disposed on said straight bar for accurately positioning said bar diametrically of the wheel and combined level and indicator means disposed on said straight bar for indicating the inclination of said bar relative to the vertical.

2. In a wheel gauge of the class described a bar, gauge arms adjustably disposed on said bar for engaging with the rim of a wheel to support said bar in a predetermined position relative to the plane of the wheel, a centering pin disposed on said bar for holding said bar diametrically relative to the wheel, level means disposed on said bar for facilitating the plumbing of said bar in one plane, and combined level and indicator means disposed on said bar for indicating the inclination of said bar from the vertical in another plane.

3. In a wheel gauge of the class described, a stright bar, two gauge arms secured to said bar in spaced apart relation for engaging with the rim of a wheel on opposite sides of the hub, one of said gauge arms being forked to prevent sidewise tiliting of the bar, said gauge arms holding the bar in a predetermined position relative to the plane of the wheel, and means on the bar for indicating the amount of inclination of the bar relative to the vertical.

4. The apparatus as described in claim 3 in which a centering pin is provided on the bar for accurately positioning said bar diametrically of the wheel.

5. In a wheel gauge of the class described, a straight bar, means on said bar for engaging with a vehicle wheel to support the bar in a predetermined position relative to the plane of the wheel, a gauge plate secured at one end to said bar and extending at right angles therefrom, and having a graduated dial on its other end and a level arm pivoted on said gauge plate and movable over said dial.

6. The apparatus as described in claim 5 in which one end of the level arm is pivoted to the gauge plate and a bubble tube is mounted on said level arm.

7. In a wheel gauge of the class described, a straight bar, a level bubble secured to said bar parallel therewith, a bubble tube secured to said bar at right angles to said bar for plumbing the same, two gauge arms adjustable lengthwise on said bar near opposite ends thereof respectively and arranged to engage with the rim of a wheel to support said bar parallel with said wheel, one of said gauge arms being formed of two divergent prongs which prevent tilting of said gauge bars, a centering pin projecting from said gauge bar for engagement with an axle to position said bar diametrically of said axle, a gauge plate projecting perpendicularly from said bar, a graduated dial on the outer end of said gauge plate, a level arm pivoted to the gauge plate near the bar and movable over said graduated dial, and a bubble tube on said level arm.

In witness whereof, I hereunto subscribe my name this 15th day of April, A. D. 1927.

CLAUDE C. BENNETT.

DISCLAIMER 1,653,249.—*Claude C. Bennett*, Seattle, Wash. AXLE-ALIGNING GAUGE. Patent dated December 20, 1927. Disclaimer filed September 22, 1934, by the patentee, the assignee, *A. E. Feragen, Inc.*, joining.

Hereby enters this disclaimer to claim 3 in said specification, which is in the following words, to wit:

In a wheel gauge of the class described, a straight bar, two gauge arms secured to said bar in spaced apart relation for engaging with the rim of a wheel on opposite sides of the hub, one of said gauge arms being forked to prevent sidewise tilting of the bar, said gauge arms holding the bar in a predetermined position relative to the plane of the wheel, and means on the bar for indicating the amount of inclination of the bar relative to the vertical.

[*Official Gazette October 23, 1934.*]